US010103954B2

(12) United States Patent
Bodziony et al.

(10) Patent No.: US 10,103,954 B2
(45) Date of Patent: Oct. 16, 2018

(54) INTER-NODES MULTICASTING COMMUNICATION IN A MONITORING INFRASTRUCTURE

(71) Applicant: INTERNATIONAL BUSINESS MACHINES CORPORATION, Armonk, NY (US)

(72) Inventors: Michal Bodziony, Tegoborze (PL); Lukasz Gaza, Jankowice (PL); Artur M. Gruszecki, Cracow (PL); Tomasz Kazalski, Cracow (PL); Konrad K. Skibski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/868,482

(22) Filed: Sep. 29, 2015

(65) Prior Publication Data

US 2017/0093660 A1    Mar. 30, 2017

(51) Int. Cl.
*H04L 12/26*    (2006.01)
*H04L 29/08*    (2006.01)
(Continued)

(52) U.S. Cl.
CPC ............ *H04L 43/08* (2013.01); *H04L 12/185* (2013.01); *H04L 41/046* (2013.01);
(Continued)

(58) Field of Classification Search
CPC . H04L 12/185; H04L 41/046; H04L 41/0622; H04L 41/0681; H04L 43/08; H04L 43/12; H04L 67/10
See application file for complete search history.

(56) References Cited

U.S. PATENT DOCUMENTS 7,733,868 B2    6/2010  Van Zijst
8,467,388 B2    6/2013  Ooghe et al.
(Continued)

FOREIGN PATENT DOCUMENTS

CN    101267356 B    4/2011

OTHER PUBLICATIONS

Bodziony et al., "Inter-Nodes Multicasting Communication in a Monitoring Infrastructure", U.S. Appl. No. 15/453,929, filed Mar. 9, 2017, 31 pages.

(Continued)

*Primary Examiner* — Michael C Lai
(74) *Attorney, Agent, or Firm* — William H. Hartwell

(57) ABSTRACT

A method for determining when to send monitoring data to a server within a monitoring infrastructure. The method includes a first agent computer collecting a first instance of monitoring data relating to an alert on a computer system, wherein the collecting is based, at least in part, on a set of instructions received from a monitoring server, wherein the set of instructions includes instructions for determining whether the monitoring data is relevant to triggering the alert. The first agent then receives at least one second instance of monitoring data from a set of second agents. The first agent then determines whether the first instance of monitoring data is relevant to triggering the alert based, at least in part, on the first instance of monitoring data and the second instance of monitoring data. The first agent then determines whether to send the first instance of monitoring data to the monitoring server.

8 Claims, 3 Drawing Sheets

(51) Int. Cl.
*H04L 12/18* (2006.01)
*H04L 12/24* (2006.01)

(52) U.S. Cl.
CPC ...... *H04L 41/0622* (2013.01); *H04L 41/0681* (2013.01); *H04L 43/12* (2013.01); *H04L 67/10* (2013.01)

(56) References Cited

U.S. PATENT DOCUMENTS

| | | | | |
|---|---|---|---|---|
| 8,937,858 B2* | 1/2015 | Shah | ...................... | H04L 12/185 370/230 |
| 2005/0226275 A1* | 10/2005 | Hrycaj | ...................... | H04L 1/188 370/474 |
| 2006/0133428 A1* | 6/2006 | Guthrie | ............... | H04L 43/0858 370/519 |
| 2009/0269053 A1* | 10/2009 | Yang | .................. | H04B 10/0791 398/22 |
| 2013/0315057 A1* | 11/2013 | Popa | ..................... | H04L 12/185 370/228 |
| 2014/0118138 A1* | 5/2014 | Cobelli | ................ | A61B 5/0004 340/539.12 |
| 2016/0080403 A1* | 3/2016 | Cunningham | ...... | H04L 63/1425 726/23 |

OTHER PUBLICATIONS

IBM, Appendix P, List of IBM Patents or Patent Applications Treated As Related, dated Mar. 9, 2017, 2 pages.

Wang et al.; "Inter Node B Node Synchronization in SFN for MBMS Transmission"; IEEE 65th Vehicular Technology Conference, VTC2007-Spring, Apr. 22-25, 2007, © 2007 Crown Copyright; pp. 2996-3000; <http://ieeexplore.ieee.org/xpl/articleDetails.jsp?arnumber=4213042&newsearch=true&queryText=Inter%20Node%20B%20Node%20Synchronization%20in%20SFN%20for%20MBMS%20Transmission>.

\* cited by examiner

INTER-NODES MULTICASTING COMMUNICATION IN A MONITORING INFRASTRUCTURE

BACKGROUND

The present invention relates generally to the field of asset monitoring, and more particularly to determining when to send monitoring data to a server within monitoring infrastructure.

Asset monitoring software typically includes a monitoring server with a database and several agents installed on one or more end nodes systems. Agents collect data, which is sent back to the server to be processed. For example, the collected data may be aggregated, stored, and/or used for a statistical analysis. The monitoring server may also contain a set of, or a definition of, alerts relating to situations when a particular event is reported to an end user as requiring attention.

In computer networking, multicast communications are group communications where information is addressed to a group of destination computers simultaneously. IP multicast is a method of sending Internet Protocol (IP) datagrams to a group of interested receivers in a single transmission. Nodes in a multicast group send join and leave messages in order to send and receive data within the group of interest.

SUMMARY

Embodiments of the present invention disclose a method, computer program product, and system for determining when to send monitoring data to a server within a monitoring infrastructure. The method includes a first agent computer collecting a first instance of monitoring data relating to an alert on a computer system, wherein the collecting is based, at least in part, on a set of instructions received from a monitoring server, wherein the set of instructions includes instructions for determining whether the monitoring data is relevant to triggering the alert. The first agent then receives at least one second instance of monitoring data from a set of second agents. The first agent then determines whether the first instance of monitoring data is relevant to triggering the alert based, at least in part, on the first instance of monitoring data and the second instance of monitoring data. The first agent then determines whether to send the first instance of monitoring data to the monitoring server.

DETAILED DESCRIPTION

Embodiments in accordance with the present invention recognize a method of communication between agents of an asset monitoring environment in order to determine data significance without requiring an additional layer of servers. Data that is determined to not be significant, and will not result in exceeding defined thresholds, is not sent back to the server. Therefore the amount of processing on the monitoring server is limited.

A problem with modern asset monitoring software, when monitoring a large infrastructure, is the large amounts of data collected from thousands of assets. When setting up an asset monitoring environment, a user, or an administrator, is typically required to decide what metrics to monitor, what metrics are crucial, and how often the identified data, or metrics, should be collected. Such decisions are usually trade-offs between gathering all interesting data and what can be handled by the central server (i.e., monitoring server), of the monitoring software. Quite commonly, the database which is used by a server can be bottlenecked due to the number of transactions being processed.

There are several known solutions for this problem. One common approach is to setup a layer of additional servers between a monitoring server and the end nodes that aggregate and send data to the central monitoring server. One disadvantage of using a layer of additional servers, however, is the additional resources needed to setup extra servers. Another known approach is to move some logic to agents to enable the agents to decide if particular data should be sent or not. One disadvantage of this approach is the interdependencies between the agents. For example, in many cases the agent is not able to decide how significant the data is without knowing the output from other agents.

Figure 1:
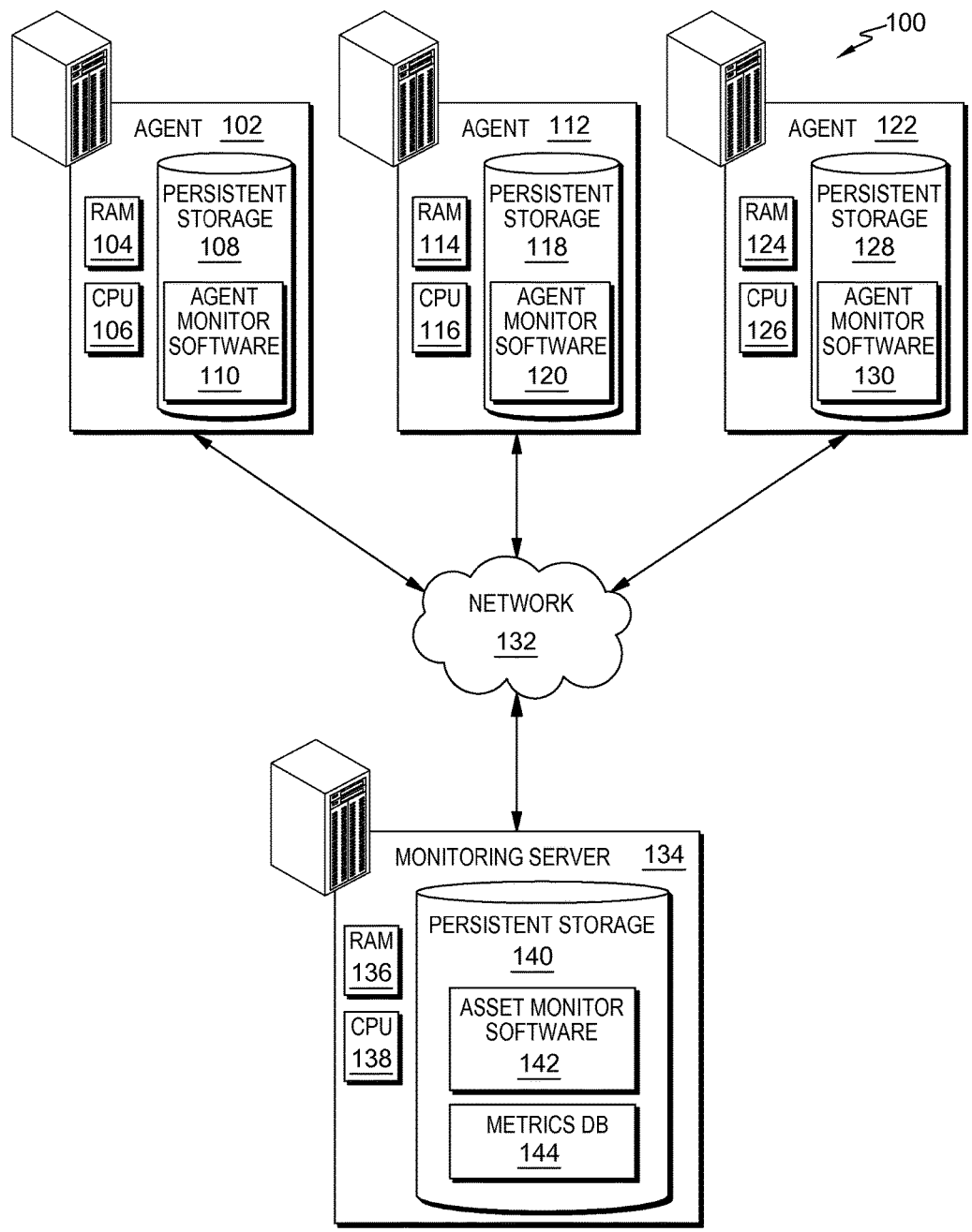
FIG. 1 is a functional block diagram illustrating an asset monitoring environment, in an embodiment in accordance with the present invention.

Embodiments in accordance with the present invention will now be described in detail with reference to the Figures. FIG. 1 is a functional block diagram, generally designated 100, illustrating an asset monitoring environment, in an embodiment in accordance with the present invention.

Asset monitoring environment 100 includes agent 102, agent 112, agent 122, and monitoring server 134, all interconnected over network 132. Agent 102 is a computer system that includes random access memory (RAM) 104, central processing unit (CPU) 106, and persistent storage 108. Agent 102 may be a Web server, or any other electronic device or computing system, capable of processing program instructions and receiving and sending data. In some embodiments, agent 102 may be a laptop computer, a tablet computer, a netbook computer, a personal computer (PC), a desktop computer, a personal digital assistant (PDA), a smart phone, or any programmable electronic device capable of communicating over a data connection to network 132. In other embodiments, agent 102 may represent server computing systems utilizing multiple computers as a server system, such as in a distributed computing environment. In general, agent 102 is representative of any electronic devices or combinations of electronic devices capable of executing machine-readable program instructions and communicating with agent 112, agent 122, and monitoring server 134 via network 132 and with various components and devices within asset monitoring environment 100.

Agent 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Agent monitor software 110 is stored in persistent storage 108, which also includes operating system software, as well as software that enables agent 102 to communicate with agent 112, agent 122, and monitoring server 134, as well as other computing devices over a data connection on network 132.

Agent monitor software 110 is used by agent 102 to perform system and/or application parameter checking based on pre-defined metrics for the node (i.e., agent, or sometimes referred to as endpoint). For example, a user, or an administrator, wants to be informed when the temperature in a server facility exceeds a certain temperature, or if the CPU consumption on agent 102 and RAM consumption on agent 112 exceed a pre-defined threshold. The user, or administrator, creates or defines, and activates, a set of one or more alerts, or a set of instructions, defining a range for one or more specific conditions, on monitoring server 134. The set of alerts is then transmitted to agent 102 and agent 112, where multicast groups are created and joined based on the activated alerts. After agent monitor software 110 obtains data relating to a particular event, or pre-defined metric, agent monitor software 110 will calculate a delay period, wherein the delay period corresponds to an amount of time that the first agent will wait before sending the first instance of monitoring data to the monitoring server, and then may transmit the data to one or more agents in a multicast group, as well as the monitoring server, at the end of the delay period. Agent 102 may join one or more multicast groups based on the activated alerts. In other example embodiments, agent monitor software 110 may receive multicast group information in addition to the set of alerts.

Figure 3:
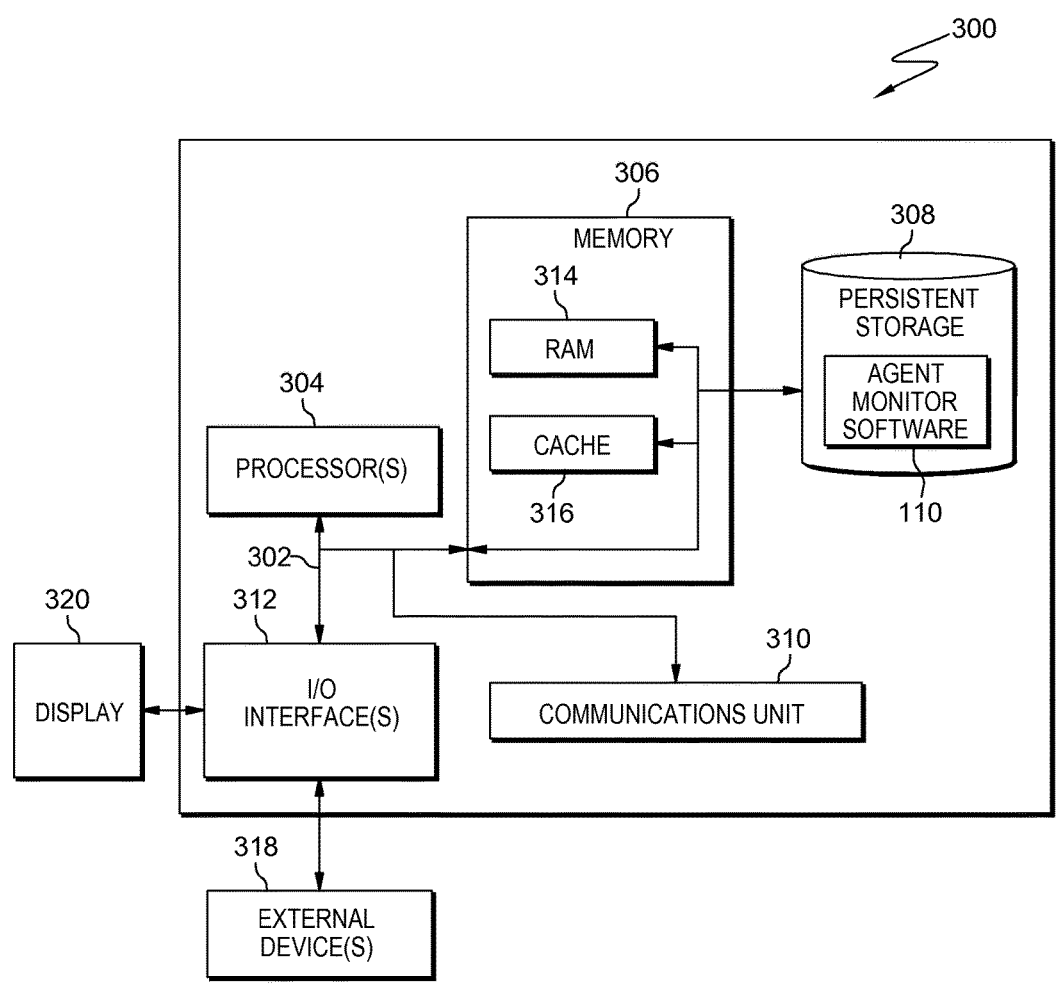
FIG. 3 depicts a block diagram of components of the agent executing the agent monitoring software, in an embodiment in accordance with the present invention.

Agent 102 may include internal and external hardware components, as depicted and described in further detail with respect to FIG. 3.

Agent 112 is also included in asset monitoring environment 100. Agent 112 contains RAM 114, CPU 116, and persistent storage 118. Agent monitor software 120, representative of agent monitor software 110, is stored in persistent storage 118, which also includes operating system software, as well as software that enables agent 112 to communicate with agent 102, agent 122, and monitoring server 134, as well as other computing devices over a data connection on network 132.

Agent 122 is also included in asset monitoring environment 100. Agent 122 contains RAM 124, CPU 126, and persistent storage 128. Agent monitor software 130, representative of agent monitor software 110, is stored in persistent storage 128, which also includes operating system software, as well as software that enables agent 122 to communicate with agent 102, agent 112, and monitoring server 134, as well as other computing devices over a data connection on network 132.

In various embodiments of the present invention, agent 112 and agent 122 may be Web servers, or any other electronic devices or computing systems, capable of processing program instructions and receiving and sending data. In some embodiments, agent 112 and agent 122 may be a laptop computer, a tablet computer, a netbook computer, a personal computer (PC), a desktop computer, a personal digital assistant (PDA), a smart phone, or any programmable electronic device capable of communicating over a data connection to network 132. In other embodiments, agent 112 and agent 122 may represent server computing systems utilizing multiple computers as a server system, such as in a distributed computing environment. In general, agent 112 and agent 122 are representative of any electronic device or combinations of electronic devices capable of executing machine-readable program instructions and communicating with agent 102, and monitoring server 134 via network 132 and with various components and devices within asset monitoring environment 100. There may be many more agents (not shown) within asset monitoring environment 100.

In FIG. 1, network 132 is shown as the interconnecting fabric between agent 102, agent 112, agent 122, and monitoring server 134. In practice, network 132 may be any viable data transport network. Network 132 can be, for example, a local area network (LAN), a wide area network (WAN) such as the Internet, or a combination of the two, and can include wired, wireless, or fiber optic connections. In general, network 132 can be any combination of connections and protocols that will support communications between agent 102, agent 112, agent 122, and monitoring server 134 in accordance with an embodiment of the invention.

Monitoring server 134 is also included in asset monitoring environment 100. Monitoring server 134 includes RAM 136, CPU 138, and persistent storage 140. Monitoring server 134 may be a Web server, or any other electronic device or computing system, capable of processing program instructions and receiving and sending data. In some embodiments, monitoring server 134 may be a laptop computer, a tablet computer, a netbook computer, a personal computer (PC), a desktop computer, a personal digital assistant (PDA), a smart phone, or any programmable electronic device capable of communicating over a data connection to network 132. In other embodiments, monitoring server 134 may represent server computing systems utilizing multiple computers as a server system, such as in a distributed computing environment. In general, monitoring server 134 is representative of any electronic devices or combinations of electronic devices capable of executing machine-readable program instructions and communicating with agent 112, agent 122, and monitoring server 134 via network 132 and with various components and devices within asset monitoring environment 100.

Monitoring server 134 includes persistent storage 140. Persistent storage 140 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Asset monitor software 142 and metrics database 144 are stored in persistent storage 140, which also includes operating system software, as well as software that enables monitoring server 134 to communicate with agent 102, agent 112, and agent 122, as well as other computing devices over a data connection on network 132.

Asset monitor software 142 is used by monitoring server 134 to define metrics for agents within asset monitoring environment 100, such as agents 102, 112, and 122, to perform system and/or application parameter checking. For example, asset monitor software 142 may be used to define metrics to monitor the CPU consumption for one or more servers, or metrics to determine the number of queries per second in a given database. In another example embodiment, asset monitor software 142 may be contained on another computing device within asset monitoring environment 100. In other example embodiments, defined rules may be stored in metrics database 144 to be transmitted to agents at a later time, or to be propagated to other monitoring servers within asset monitoring environment 100.

Metrics database 144 is used by asset monitor software 142 to store received metrics from monitored agents within asset monitoring environment 100. For example, when an agent reports a pre-defined metric to monitoring server 134, asset monitor software 142 may perform one or more actions based on the defined metric, then add the received metric to metrics database 144. In one example embodiment, metrics database 144 may be contained in another computing device within asset monitoring environment 100.

Figure 2:
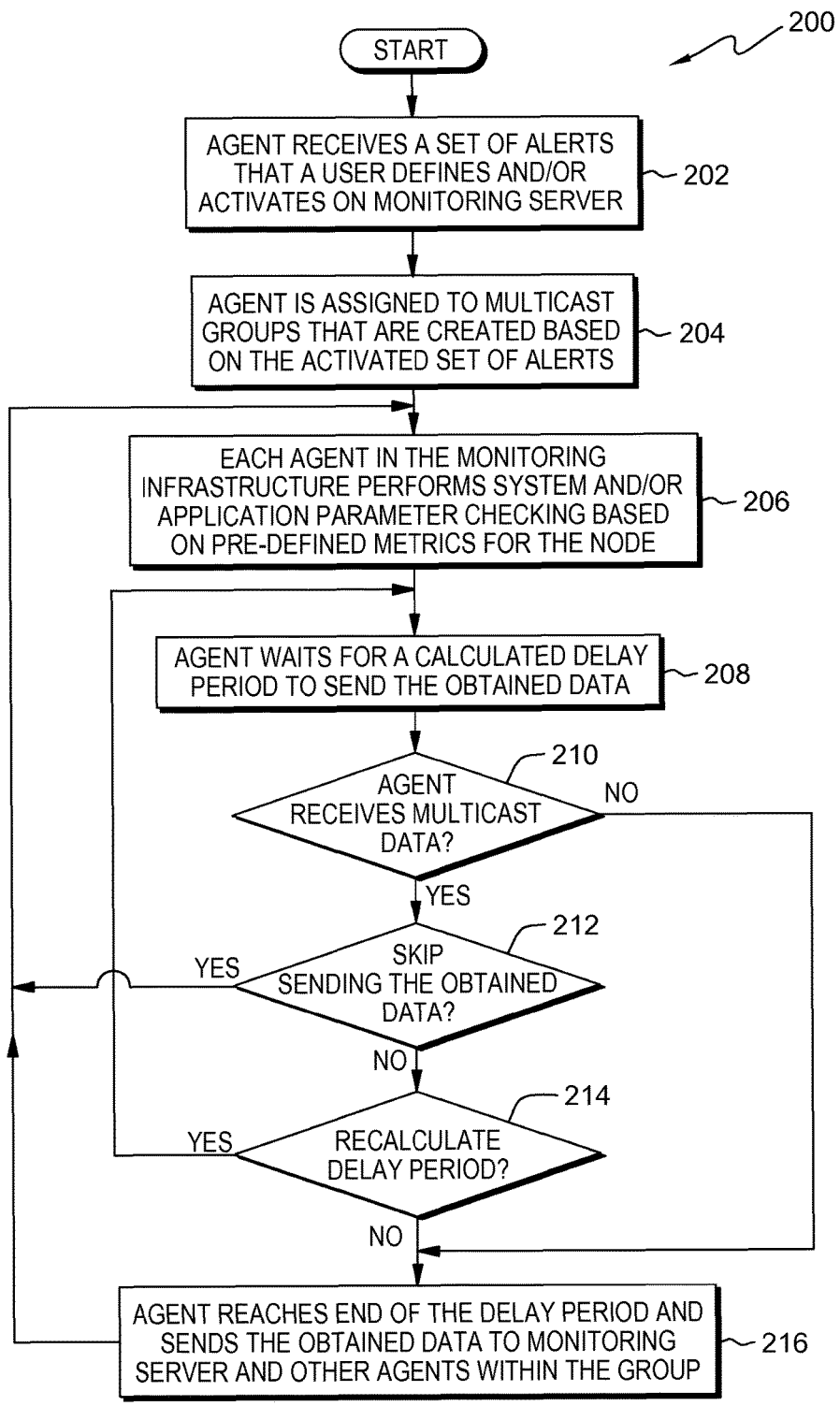
FIG. 2 is a flowchart depicting operational steps of an agent monitoring software, on an agent within the asset monitoring environment of FIG. 1, for monitoring one or more metrics on the agent and limiting the amount of data being sent back to the monitoring server, in an embodiment in accordance with the present invention.

FIG. 2 is a flowchart, generally designated 200, depicting operational steps of an agent monitoring software, on an agent within the asset monitoring environment of FIG. 1, for monitoring one or more metrics on the agent and limiting the amount of data being sent back to the monitoring server, in an embodiment in accordance with the present invention. In one example embodiment, a method for limiting the amount of data sent back to server within a monitoring infrastructure may be based on: (i) a tree-kind structure of agent groups defined by the alerts rules within the system, (ii) multicast communication between the agents, wherein the multicast communication between the agents is direct or via a server, and/or (iii) alert thresholds (which are likely to be constant, defined by alert definition) and measurements that have impact on delays.

Agent monitor software 110 receives a set of alerts that a user, or administrator, defines using asset monitor software 142 on monitoring server 134 as depicted in step 202. In other example embodiments, asset monitor software 142 may also retrieve predefined rules from metrics database 144 to use on one or more agents within asset monitoring environment 100. For example, a user of asset monitor software 142 may select a predefined rule to monitor the network utilization for a particular network and load, or apply, it to certain agents within asset monitoring environment 100. In another example embodiment, the thresholds and metrics used to evaluate a particular rule may be chosen by a user. For example, a user of asset monitor software 142 may define, or create, a rule by selecting thresholds or metrics for a particular CPU consumption. In other example embodiments, a user of asset monitor software 142 may combine a plurality of rules into one using logic connectors such as AND, OR, etc. For example, a user of asset monitor software 142 may create a rule by selecting and combining a rule to trigger when the CPU consumption is higher than 90% with another rule to trigger an alert when RAM utilization is higher than 70%. In another example embodiment, agent monitor software 110 may receive instructions to activate or deactivate a set of previously defined alerts from asset monitor software 142.

In step 204, agent monitor software 110 assigns agent 102 to one or more multicast groups that are created based on the activated set of alerts. Each defined alert created by asset monitor software 142 identifies the system(s), and as a result, the agent(s) installed on the system(s), that take a part in the alert calculation. Each agent involved in an alert calculation creates a multicast group for the defined alert, and each agent may be a member of more than one multicast group. In one example embodiment, an administrator may define an alert which is triggered immediately after the CPU consumption becomes higher than 90% on agent 112. As a result of receiving the alert, agent monitor software 120 installed on agent 112 creates a singleton multicast group including only agent 112. In another example embodiment, an administrator wants to be notified when the CPU is higher than 80% and RAM utilization is higher than 70% on agent 122. Agent monitor software 130 installed on agent 122 creates a singleton multicast group with two parameters (i.e., CPU and RAM) to be communicated within the group. In another example embodiment, an administrator creates an alert for agent 102, 112, and 122 to monitor a particular transaction and alert asset monitor software 142 when the particular transaction takes longer than 3 seconds. Agent 102, 112, and 122 each individually monitor the transaction time however, they all belong to one multicast group. Asset monitor software 142 may determine which agent will create the multicast group and transmit monitoring instructions to agents 102, 112, and 122.

Each agent in the monitoring infrastructure performs system and/or application parameter checking based on pre-defined metrics, as depicted in step 206. In order to collect required data, each agent monitor performs periodic pre-defined checks on the monitored system using available system tools and utilities such as "top" on a Linux system. The top program provides a dynamic real-time view of a running system as well as display system summary information and a list of tasks currently being managed by the Linux kernel. The top command monitors CPU utilization, process statistics, and memory utilization, as well as system uptime, load average, process counts, CPU status, and utilization statistics for both memory and swap space. In one example embodiment, agent monitor software 110, 120, and 130 may include software to perform periodic checks of all the necessary system and/or application parameters on agents 102, 112, and 122. In another example embodiment, a group of agents, such as agents 102, 112, and 122, may monitor transactions within asset monitoring environment 100 in a reactive mode collecting relevant data once the alert is triggered.

In step 208, agent monitor software 110 waits for a calculated delay period before sending obtained data, resulting from one or more conditions being met for one or more predefined metrics, to asset monitor software 142. The delay period is the amount of time after agent monitor software 110 will wait before multicasting the received obtained data to all other agents within the registered multicast groups. The delay is calculated immediately after agent monitor software 110 obtains one or more metrics and is based on how significant the data influences the alerts formulas. Stated another way, based on the data, the delay period reflects the possibility that the alert conditions will be met. A shorter delay period means the possibility of triggering the alert is higher, and the smaller the calculated possibility of triggering an alert is, the longer the agent will wait before sending data.

One method that can be used for delay calculations is based on the graphical representation of the alert formula. Each alert formula can be represented as a function taking several arguments as inputs (for example, "$f(x_1, x_2, \ldots, x_n)$" for arguments 1 through n) and returning a value in the domain of scalars (i.e. real numbers). If the returned value is beyond a certain threshold the alert is triggered.

Although such a function may not always be continuous, it is typically regular enough to calculate the integral. This property (i.e. the integral) will be used to calculate the delay period. Assuming that the agent obtained the value $X_k$ of the k metric, the delay can be calculated using following equation:

Delay Calculation Equation $$D = \left(0.5 - \left|0.5 - \frac{\int g(f(x_1, x_2, \ldots, x_k, \ldots x_n))}{\int 1}\right|\right) * T$$

In the above delay calculation equation, D is the calculated delay time, $x_1$, $x_2$, $x_k$, and $x_n$ are the received data from triggered events. T is a constant parameter depending on environment circumstances. Stated another way, T depends on the frequency of the agents obtaining data and cannot exceed the time period between probing the system. The function g is defined in the following way:
Definition of g(x)

$$g(x) = \begin{cases} 1 \text{ when } x \text{ is above the alert threshold level} \\ 0 \text{ when } x \text{ is below the alert threshold level} \end{cases}$$

In some cases, the decision may be made to not send the data at all. For example, when at least one agent from a group multicasts the data within the group, and based only on this information (without data collected by another agent) the probability of hitting the alert is 0%, then the agent may decide not to send the data. In other example embodiments, any formula may be used to calculate the percentage for triggering the event and calculating the delay periods.

Using the example where an administrator wants to be notified when the CPU is higher than 80% and RAM utilization is higher than 70% on agent 122. if CPU is higher than 80%, based on the delay calculation equation the delay will be 0.3*T (i.e., the probability of triggering the alert is proportional to how many RAM utilization values will trigger the alert and how many will not). For this particular example g(f(x)) is 0.3 because, according to the delay calculation equation and the definition of g(x), g(f(x)) equals 1 when RAM utilization is greater than or equal to 70%, therefore only 30% or 0.3 of the function is above the threshold when RAM is greater than or equal to 70%. So the CPU utilization information will be sent after (0.5−|0.5−0.3|*T) seconds (i.e. 0.3*T seconds). If CPU is below 80%, the function f is equal to 0 on whole RAM utilization domain (i.e., there is no RAM utilization value that can trigger the alert). So, based on the delay calculation equation, the event data will be sent immediately. In other embodiments, the delay period may be calculated using any method incorporating the event data, the number of multicast nodes in the group, and the number of multicast alerts received by a first agent for the given alert.

In decision step 210, agent monitor software 110 checks to see if at least one second instance of monitoring data (i.e., multicast data) is received from a set of second agents (i.e., another agent) in the same multicast group for the defined event. In some cases the data will not be sent to monitoring server 134 at all based on the alert and/or the data. Agent monitor software 110 will not send the event data to asset monitor software 142 if the event data does not meet a required threshold or is not being monitored for in the same multicast group. For example, in one embodiment, an agent is collecting data (i.e., monitoring for an event), and based on the alert formula, it is hard to determine if the alert will be triggered when taking other agents results into account. In such a situation the delay should be comparatively longer. In a case where there are more clear results, where an agent is able to say that the importance of the data is high (i.e., there is a high possibility of triggering the alert OR it is highly possible that the alert will not be triggered at all), those alerts should be sent much faster to provide this information to other agents. If multicast data is not received ("No" branch, decision 210), agent monitor software 110 waits for the remainder of the calculated delay period and then sends the obtained data to asset monitor software 142 and other agents within the multicast group, as depicted in step 216. If multicast data is received ("Yes" branch, decision 210), agent monitor software 110 determines whether to send the obtained data to asset monitor software 142 or not, as depicted in decision step 212.

In decision step 212, agent monitor software 110 determines whether the data should not be sent to asset monitor software 142, (i.e., should the data be skipped?). If agent monitor software 110 determines that the data should be skipped ("Yes" branch, decision 212), agent monitor software 110 ignores the obtained data and repeats steps 206 and 208 as depicted in FIG. 2. In the period of time between obtaining and multicasting a certain event data "A", another agent in the multicast group may have already sent event data "A". In this case the delay period is recalculated and it may appear that sending the event data may not be necessary because the threshold may not be reached. In other example embodiments, agent monitor software may check metrics database 144 when determining if certain event data has been already sent. If agent monitor software 110 determines that the obtained data should not be skipped ("No branch, decision 212), agent monitor software determines if the delay period should be recalculated, as depicted in decision step 214.

In decision step 214, agent monitor software 110 determines if the delay period should be recalculated as depicted. If agent monitor software 110 determines that the delay period should be recalculated ("Yes" branch, decision 214), agent monitor software 110 repeats step 208 as depicted in FIG. 2. The recalculation takes the new value(s) provided by the other agents into account when calculating the new delay period. For example, using the three agents from FIG. 1: agent 102 is responsible for detecting a certain transaction type, agent 112 is responsible for measuring the time spent on an application server (not shown), and agent 122 is responsible for measuring a database, such as metrics database 144, response time. Agents 102, 112, and 122 all belong to the same multicast group for the monitored event. If agent 102 detects a transaction that it is not monitoring for, the delay will be 0. The data will be multicast, or transmitted, to the other agents in the multicast group immediately. Agents 112 and 122 will be able to make a decision on whether to send any event data to the monitoring server based on the received multicast data information. In this case, the received data was not being monitored by agents 112 and 122, resulting in the function f being equal to 0 on the whole domain, meaning the probability of triggering an alert will be 0%. If agent 102 detects a type of transaction that is being monitored, the delay will be proportional to probability of triggering the alert. However if in the meantime, both agents 112 and 122, responsible for transaction time tracking, happen to multicast their results, it may appear that transaction type info will not be sent at all until the end of the delay period is reached.

If agent monitor software 110 determines that the delay period should not be recalculated ("No" branch, decision 214), agent monitor software 110 reaches the end of the delay period and sends the obtained data to asset monitor software 142 and other agents within the multicast group, as depicted in step 216. After reaching the end of delay period, the data obtained by agent 102 is sent to the monitoring server and other agents within the group and may be used for revalidation of the delay period, or used as a base in determining whether to send data at all. In another example embodiment, multicasting data between agents may be implemented in an environment which includes several sub-networks. In other example embodiments, agents within one group may not able to communicate with each other if they reside in separate sub-networks. In this case the communications may go through a server (not shown), and be handled on the network card level, rather than handled on an application level.

Agent monitor software 110 then repeats steps 206 through 216 until instructions to deactivate the set of previously defined alerts is received from asset monitor software 142, as depicted in FIG. 2. In other example embodiments, asset monitor software 142 may activate and deactivate predefined rules at certain times on agents within asset monitoring environment 100. For example, an administrator may be trying to debug a delay for a specific transaction that regularly occurs during a certain timeframe. The administrator may define rules for the specific transaction, network utilization, CPU utilization, RAM utilization and other event types to be monitored by agents within asset monitoring environment 100. Asset monitor software 142 may then activate the defined rules on the agents during the certain timeframe to help isolate the delay for the specific transaction.

In an example environment, where typical agent-host communication takes place regularly between two sides, there may be a group of agents which can be considered autonomous (i.e., the group of agents collect the monitoring data from monitoring activities and send the whole package back to monitoring server 134 from time to time). In the case of such autonomous agents, agent 102 may not be aware of the monitoring data collected by the agent monitor software, so it is not able to make any decision based on that monitoring data (e.g. whether to postpone the alert calculation and send the data). In another example environment, agent monitor software is located in a cloud (for example, software as a service) environment on a vendor side, and agents 102, 112, and 122 are installed on customer systems. Due to security reasons, the communication in such environments may be one-way only. Therefore agents 102, 112, and 122 would be sending data back to monitoring server 134, however, monitoring server 134 may not be able to communicate back to agents. In both of the above example environments, the typical approach with a host doing the processing and communicating back to nodes cannot be implemented due to limitations. Embodiments described in the present invention address these limitations by allowing agent monitor software on the host to assess the relevance of the monitoring data and determine whether to postpone the alert calculation and send the data.

FIG. 3 depicts a block diagram, generally designated 300, of components of the agent executing the agent monitoring software, in an embodiment in accordance with the present invention. It should be appreciated that FIG. 3 provides only an illustration of one implementation and does not imply any limitations with regard to the environments in which different embodiments may be implemented. Many modifications to the depicted environment may be made.

Agent 102 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Agent monitor software 110 stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of network 132 and agent 112, agent 122 and monitoring server 134. In these examples, communications unit 310 includes one or more network interface cards. Communications unit 310 may provide communications through the use of either or both physical and wireless communications links. Agent monitor software 110 may be downloaded to persistent storage 308 through communications unit 310.

I/O interface(s) 312 allows for input and output of data with other devices that may be connected to agent 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., agent monitor software 110, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
one or more computer readable storage media and program instructions stored on the one or more computer readable storage media, the program instructions comprising:
program instructions to collect, by a first agent, a first instance of monitoring data relating to an activated alert on a computer system, wherein the collecting is based, at least in part, on a set of instructions received from a monitoring server, wherein the set of instructions identifies the first agent and a second agent of a plurality of agents in a multicast group, and wherein the second agent monitors for a second instance of monitoring data;
program instructions to obtain, by the first agent, a value for a first metric that is included in the collected first instance of monitoring data;
program instructions to calculate, by the first agent, a delay period to wait before sending the first instance of monitoring data to the monitoring server and to the plurality of agents in the multicast group, wherein the delay period is based on how likely an alert condition is to be met based on the value of the first metric;

program instructions to receive, by the first agent, the second instance of monitoring data from the second agent;

program instructions to obtain, on the first agent, a value for a second metric that is included in the received second instance of monitoring data;

program instructions to determine, by the first agent, whether the collected first instance and the received second instance of monitoring data are relevant to triggering the activated alert based, at least in part, on whether the value for the first metric and the value for the second metric are above respective alert thresholds;

program instructions to, responsive to determining that the collected first instance and the received second instance of monitoring data are not relevant to triggering the activated alert, determine, by the first agent, not to send the first instance and the second instance of monitoring data to the monitoring server; and program instructions to, responsive to determining not to send the first instance and the second instance of monitoring data to the monitoring server, recalculate, by the first agent, the delay period, wherein the recalculated delay period is based on how likely an alert condition is to be met based on the values of the first metric and the second metric.

2. The computer program product of claim 1, wherein the set of instructions received from the monitoring server further comprises:

one or more instructions defining one or more specific conditions to be monitored on one or more of the agents, wherein the one or more instructions define a range or limit for the one or more specific conditions; and definitions of one or more multicast groups for the one or more specific conditions.

3. The computer program product of claim 1, wherein the program instructions to calculate a delay period comprise:

program instructions to calculate a first integral based on the value of the first metric included in the collected first instance of monitoring data; and program instructions to calculate the delay period by multiplying the first integral by a constant parameter, wherein the constant parameter is based on a frequency by which the first agent obtains monitoring data.

4. The computer program product of claim 1, wherein the program instructions to recalculate a delay period comprise:

program instructions to calculate a second integral based on the value of the first metric included in the collected first instance of monitoring data and the value of the second metric included in the received second instance of monitoring data; and program instructions to recalculate the delay period by multiplying the second integral by a constant parameter, wherein the constant parameter is based on a frequency by which the first agent and the second agent obtain monitoring data.

5. A computer system comprising:
one or more computer processors;
one or more computer readable storage media;
program instructions stored on the computer readable storage media for execution by at least one of the one or more processors, the program instructions comprising:

program instructions to collect, by a first agent, a first instance of monitoring data relating to an activated alert on a computer system, wherein the collecting is based, at least in part, on a set of instructions received from a monitoring server, wherein the set of instructions identifies the first agent and a second agent of a plurality of agents in a multicast group, and wherein the second agent monitors for a second instance of monitoring data;

program instructions to obtain, by the first agent, a value for a first metric that is included in the collected first instance of monitoring data;

program instructions to calculate, by the first agent, a delay period to wait before sending the first instance of monitoring data to the monitoring server and to the plurality of agents in the multicast group, wherein the delay period is based on how likely an alert condition is to be met based on the value of the first metric;

program instructions to receive, by the first agent, the second instance of monitoring data from the second agent;

program instructions to obtain, on the first agent, a value for a second metric that is included in the received second instance of monitoring data;

program instructions to determine, by the first agent, whether the collected first instance and the received second instance of monitoring data are relevant to triggering the activated alert based, at least in part, on whether the value for the first metric and the value for the second metric are above respective alert thresholds;

program instructions to, responsive to determining that the collected first instance and the received second instance of monitoring data are not relevant to triggering the activated alert, determine, by the first agent, not to send the first instance and the second instance of monitoring data to the monitoring server; and program instructions to, responsive to determining not to send the first instance and the second instance of monitoring data to the monitoring server, recalculate, by the first agent, the delay period, wherein the recalculated delay period is based on how likely an alert condition is to be met based on the values of the first metric and the second metric.

6. The computer system of claim 5, wherein the set of instructions received from the monitoring server further comprises:

one or more instructions defining one or more specific conditions to be monitored on one or more of the agents, wherein the one or more instructions define a range or limit for the one or more specific conditions; and definitions of one or more multicast groups for the one or more specific conditions.

7. The computer system of claim 5, wherein the program instructions to calculate a delay period comprise:

program instructions to calculate a first integral based on the value of the first metric included in the collected first instance of monitoring data; and program instructions to calculate the delay period by multiplying the first integral by a constant parameter, wherein the constant parameter is based on a frequency by which the first agent obtains monitoring data.

8. The computer system of claim 5, wherein the program instructions to recalculate a delay period comprise:

program instructions to calculate a second integral based on the value of the first metric included in the collected first instance of monitoring data and the value of the second metric included in the received second instance of monitoring data; and program instructions to recalculate the delay period by multiplying the second integral by a constant parameter, wherein the constant parameter is based on a frequency by which the first agent and the second agent obtain monitoring data.

* * * * *